(12) United States Patent
Ross et al.

(10) Patent No.: US 7,712,021 B2
(45) Date of Patent: May 4, 2010

(54) SYSTEM, METHOD AND MEDIUM FOR COMPONENT BASED WEB USER INTERFACE FRAMEWORKS

(75) Inventors: Justin Ross, Somerville, MA (US); Rafael H. Schloming, Somerville, MA (US); Archit Shah, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 738 days.

(21) Appl. No.: 11/089,017

(22) Filed: Mar. 25, 2005

(65) Prior Publication Data

US 2006/0218487 A1 Sep. 28, 2006

(51) Int. Cl.
G06F 17/00 (2006.01)

(52) U.S. Cl. ...................... 715/206; 715/234

(58) Field of Classification Search ................ 715/500, 715/501.1, 514, 200, 205, 234, 206
See application file for complete search history.

(56) References Cited

U.S. PATENT DOCUMENTS

| | | | | |
|---|---|---|---|---|
| 5,619,640 A | * | 4/1997 | Tezuka et al. ............... 715/762 |
| 5,890,171 A | * | 3/1999 | Blumer et al. ........... 715/501.1 |
| 5,973,695 A | * | 10/1999 | Walsh et al. ................ 715/854 |
| 5,999,190 A | * | 12/1999 | Sheasby et al. ............. 345/589 |
| 6,049,812 A | * | 4/2000 | Bertram et al. ............. 715/205 |
| 6,088,707 A | * | 7/2000 | Bates et al. .............. 715/501.1 |
| 6,493,702 B1 | * | 12/2002 | Adar et al. ...................... 707/3 |
| 6,862,711 B1 | * | 3/2005 | Bahrs et al. ................. 715/205 |
| 6,941,509 B2 | * | 9/2005 | Harris ......................... 715/201 |
| 7,024,622 B1 | * | 4/2006 | Young ......................... 715/234 |
| 7,254,540 B2 | * | 8/2007 | Fay et al. .................... 704/270 |
| 7,275,114 B2 | * | 9/2007 | Allen et al. ................. 709/245 |
| 7,287,215 B2 | * | 10/2007 | Arcuri et al. ................ 715/206 |
| 7,331,038 B1 | * | 2/2008 | Snodgrass et al. ........... 717/123 |
| 7,457,801 B2 | * | 11/2008 | Liu et al. ........................ 707/5 |
| 2002/0156814 A1 | * | 10/2002 | Ho .............................. 707/514 |
| 2003/0074448 A1 | * | 4/2003 | Kinebuchi et al. .......... 709/225 |
| 2003/0084034 A1 | * | 5/2003 | Fannin .......................... 707/3 |
| 2003/0131317 A1 | * | 7/2003 | Budka et al. ................ 715/514 |
| 2003/0225853 A1 | * | 12/2003 | Wang et al. ................. 709/217 |
| 2004/0010556 A1 | * | 1/2004 | Kawakita et al. ............ 709/206 |
| 2004/0024848 A1 | * | 2/2004 | Smith et al. ................. 709/219 |
| 2004/0107404 A1 | * | 6/2004 | Burns et al. ................. 715/526 |
| 2004/0183838 A1 | * | 9/2004 | Lahiri ......................... 345/854 |

(Continued)

OTHER PUBLICATIONS

Kelly et al., Aliasing on the World Wide Web: Prevalence and Performance Implications, ACM 2002, pp. 281-292.*

(Continued)

Primary Examiner—Cong-Lac Huynh
(74) Attorney, Agent, or Firm—Wilmer Cutler Pickering Hale and Dorr LLP

(57) ABSTRACT

A system, method and medium for utilizing a parameter hierarchy having state information to generate a uniform resource locator (URL). In one embodiment of the present invention, a method includes the steps of creating a component hierarchy that includes at least one component object associated with a web page, and creating a parameter hierarchy that includes at least one parameter object that includes state information respectively associated with at least one of said component objects. Finally, the parameter hierarchy is utilized to generate a URL that can render the component hierarchy.

15 Claims, 10 Drawing Sheets

U.S. PATENT DOCUMENTS

| | | | |
|---|---|---|---|
| 2004/0193699 A1* | 9/2004 | Heymann et al. | 709/218 |
| 2005/0210382 A1* | 9/2005 | Cascini | 715/531 |
| 2005/0216829 A1* | 9/2005 | Kalinichenko et al. | 715/513 |
| 2006/0117262 A1* | 6/2006 | Nagayama | 715/734 |
| 2006/0129906 A1* | 6/2006 | Wall | 715/500 |
| 2006/0136381 A1* | 6/2006 | Glaser et al. | 707/3 |
| 2006/0149833 A1* | 7/2006 | Dan et al. | 709/218 |
| 2006/0236268 A1* | 10/2006 | Feigenbaum | 715/853 |
| 2006/0242266 A1* | 10/2006 | Keezer et al. | 709/218 |
| 2006/0242557 A1* | 10/2006 | Nortis, III | 715/509 |
| 2006/0253809 A1* | 11/2006 | Karniewicz | 716/1 |
| 2006/0277199 A1* | 12/2006 | Joret et al. | 707/10 |
| 2008/0148144 A1* | 6/2008 | Tatsumi | 715/235 |
| 2008/0195933 A1* | 8/2008 | McKellar et al. | 715/234 |
| 2008/0294613 A1* | 11/2008 | Iyer et al. | 707/4 |
| 2009/0132966 A1* | 5/2009 | Lahiri | 715/853 |

OTHER PUBLICATIONS

Eiron et al., Locality, Hierarchy, and Bidirectionality in the Web, Google 2003, pp. 1-10.*

Dachselft et al., CONTIGRA: An XML-Based Architecture for Component-Oriented 3D Applications, ACM 2002, pp. 155-163.*

* cited by examiner

302 — Page page — 320
304 — TabbedPane body — 322
306 — Pane1 pane1 — 324
308 — TicketDetail ticketDetail — 326
310 — Pane2 pane2 — 328
312 — Form addTicket — 330
314 — TextInput subject — 332
316 — TextArea description — 334
318 — DateInput discoveryDate — 336

FIG. 3

RELATED ART

500

502

File Edit View Go Bookmarks Tools Help http://bicycle.boston.redhat.com/web/bicycle, Home > Channel 'achilles-util.build.i686.RHEL3.sun.1.4.2_01'
Channel 'achilles-util.build.i686.RHEL3.sun.1.4.2_01'

Cycles

*This page lists all cycles associated with the given channel.*

1 | 2 | 3 | 4 | 5 | 6

| Time | Status |
|---|---|
| Wed 22 Sep 7:03 PM, 144 days ago | 1 subcycle, 0 with warnings, 0 with failures |
| Wed 22 Sep 6:03 PM, 145 days ago | 1 subcycle, 0 with warnings, 0 with failures |
| Wed 22 Sep 5:03 PM, 145 days ago | 1 subcycle, 0 with warnings, 0 with failures |
| Wed 22 Sep 4:13 PM, 145 days ago | 1 subcycle, 0 with warnings, 0 with failures |
| Wed 22 Sep 3:08 PM, 145 days ago | 1 subcycle, 0 with warnings, 0 with failures |
| Wed 22 Sep 2:02 PM, 145 days ago | 1 subcycle, 0 with warnings, 0 with failures |
| Wed 22 Sep 1:22 PM, 145 days ago | 1 subcycle, 0 with warnings, 0 with failures |
| Wed 22 Sep 1:08 PM, 145 days ago | 1 subcycle, 0 with warnings, 0 with failures |
| Wed 22 Sep 12:02 PM, 145 days ago | 1 subcycle, 0 with warnings, 0 with failures |

Done

FIG. 5

RELATED ART

SYSTEM, METHOD AND MEDIUM FOR COMPONENT BASED WEB USER INTERFACE FRAMEWORKS

BACKGROUND OF THE INVENTION

1. Field of the Invention

The present invention generally relates to a system, method and medium for enabling components to be added to a web page while preserving use of the uniform resource locator (URL) associated therewith and, more particularly, to a system, method and medium for enabling the components to be added by separating the component hierarchy from the parameter hierarchy within and/or utilized by a user interface framework.

2. Background of the Invention

Today's World Wide Web (WWW) sites deliver a wide variety of dynamic, personalized content to end users. Although a variety of technologies exist, such as, for example, component-based web user interface frameworks that facilitate building sophisticated web sites, known technologies and/or frameworks do not provide a solution to the problem of non-addressable URLs that may be caused by one or more changes to a component hierarchy. As used herein, the WWW refers to a system of internet protocol (IP) servers that support documents that are formatted in markup languages such as HyperText Markup Language (HTML), Extensible Markup Language (XML), Wireless Markup Language (WML), or Hand-held Device Markup Language (HDML). The term WWW as used in this specification can also to refer to any server or connected group or interconnected groups of servers that implement a hyperlinking protocol, such as HyperText Transfer Protocol (HTTP) or Wireless Application Protocol (WAP), in support of Uniform Resource Identifiers (URIs) and documents in markup languages, regardless whether such servers or groups of servers are coupled to the WWW as such.

HTTP, the underlying protocol used by the WWW, defines how messages are formatted and transmitted, and what actions Web servers and browsers should take in response to various commands. For example, when a user enters a URL into a browser, this actually sends an HTTP command to the Web server directing it to fetch and transmit the requested Web page.

HTTP is called a stateless protocol because each command is executed independently, without any knowledge of the commands that came before it. This is the main reason that it can be difficult to implement Web sites that react intelligently to user input.

There can thus be problems in developing user interfaces (UIs) for the Web. One such problem is that state management, converting raw HTTP requests state into UI state and vice versa, typically requires substantial manual intervention by the programmer. Programmers thus have to carefully name each state parameter, using knowledge of all the other state parameters in the Web UI, to avoid namespace collisions. As used herein, a namespace is a means of resolving naming conflicts by defining a globally unique name for a particular set of elements.

A second problem associated with developing UIs for the Web, a product of the first, is that Web UI code is generally difficult to reuse. Programmers cannot generally use code from an old UI in a new UI without modifying the code because the code contains custom state management logic. The state management logic is appropriate only to the old UI. Thus, if the code is introduced into a new UI without careful modification, the code can cause namespace collisions.

Web UI frameworks thus need to provide state management, and component UI frameworks need to support composability and reusability. Existing systems, such as Bebop and JavaServer™ Faces (JSF), satisfy these requirements by, for example, utilizing a component framework that can provide URI encoded data that resolves namespace collisions.

FIG. 1, generally at 100, shows an exemplary simplified architecture of JSF. JSF is a server side 103 UI component framework for Java technology based web applications. The current version of the JSF specification is version 1.2, as defined by Java Specification Requests (JSR) 252, which was released for early draft review on Dec. 8, 2004. JSF version 1.2 is incorporated herein by reference.

Client side 101 devices can include devices such as a standard personal computer (PC) 102, a cellular telephone 104, and/or a personal digital assistant (PDA) 106. Server side 103 can include, for example, a standard server 108 computing device. A servlet 124 can run on server 108, and generally serve as an interface or gatekeeper between server side 103 and client side 101. As used herein, a servlet 124 is a web component, managed by a container, that generates dynamic content. Servlets 124 are platform independent Java classes that are compiled to platform neutral bytecode that can be loaded dynamically into and run by a Java enabled web server, such as server 108. Servlets 124 interact with web clients 102, 104, 106 via a request/response paradigm implemented by the servlet container.

JSF page 110 utilizes a regime, such as a tree 114 of UI components, which can be associated with backend model objects called backing beans 122. Backing beans 122 handle application logic (sometimes called business logic). HTML renderer 112 is used to display on PC 102 (and/or similar devices) the data maintained in component tree 114. JSF page 116 also utilizes a component tree 120, which can also be associated with backing beans 122. Wireless Markup Language (WML) renderer 118 is used to display the data maintained in components 120 on wireless devices such as cellular telephone 104 and/or PDA 106.

In JSF, component trees 114 and 120 can thus be used for displaying a structure in which content may be presented on different client types (e.g., PC 102 and cellular telephone 104) using different protocols (e.g., HTML for personal computer 102 and WML for cellular telephone 104). The individual components 126, 128, 130 of component trees 114, 120 are configurable, reusable elements that compose (e.g., are used to render) the user interfaces of JSF applications. Components 126, 128, 130 can be, for example, a table, a frame, and the like.

All code in a UI is encapsulated inside the components (e.g., components 126, 128, 130). Components 126, 128, 130 adhere to the following rules:

1. Each component (e.g., component 126, 128, 130) has a name, unique with respect to its siblings;
2. Each component (e.g., component 126, 128), except for the root component (e.g., component 130), has one parent component;
3. Each component (e.g., component 126, 128, 130) may contain child components; and
4. Each component (e.g., component 126, 128, 130) may contain state parameters.

Rules 2 and 3 place each component in a component hierarchy.

FIG. 2 is an exemplary diagram of a component hierarchy. Each (C) (e.g., 202a-e) represents a component, and each string adjacent to a component in quotes (e.g., "root" 204a, 204b-e, etc.) is a component name. Similarly, each (P) (e.g., 206a-c) represents a parameter, and each string adjacent to a parameter in quotes (e.g., "exampleparam" 208b) is a parameter name. Component trees 114, 120 may assume a form such as shown in FIG. 2.

A component hierarchy such as shown in FIG. 2 can be used to facilitate naming parameters by enabling a set of unique paths to be produced, one for each node. For example, note that FIG. 2 has three parameters named exampleparam: exampleparam 208a, exampleparam 208b, and exampleparam 208c. Ordinarily, having three parameters with the same name would be problematic, because the following illustrative scenario may result when state is marshaled to a URL:

exampleparam=foo
exampleparam=bar
exampleparam=baz

The situation above result leads to indeterminacy regarding which value belongs to which parameter, and generally results in web page failure or unexpected behavior.

One possible solution that may be implemented to avoid indeterminacy is to utilize the order of the parameters (e.g., foo, bar, and baz are utilized first, second, and third, respectively). However, this approach is not reliable because a fourth exampleparam parameter may be added, for example, between exampleparam 208a and exampleparam 208b, which would change the order of the parameters.

Therefore, instead of utilizing the order of the parameters, a rule can be utilized providing that state parameters are named according to their unique position in the component hierarchy 200. When this rule is utilized in connection with a component hierarchy 200 such as shown in FIG. 2, the names are instead:

root.alpha.kingdom.exampleparam=foo
root.alpha.phylum.exampleparam=bar
root.beta.exampleparam=baz There are no namespace collisions, and components can be readily matched with their respective state parameter value.

Thus, as previously discussed, known systems support composability and reusability by utilizing a component hierarchy such as shown in FIG. 2 to resolve namespace collisions. However, while use of a component hierarchy provides state management and supports composability and reusability, use of a component hierarchy also makes it more difficult to enable a Web application to continue to function after changes to the appearance of (e.g., after one or more components are added to a component hierarchy and/or one or more components are deleted from a component hierarchy) the Web application.

FIG. 3, generally at 300, shows an exemplary component hierarchy that is in code form. FIG. 3 can also thus be referred to as a component hierarchy, and generally correspond to (or be derived from) the form of the component hierarchy 200 shown in FIG. 2. In FIG. 3, standard class names (e.g., Java class names) are generally represented as the first word on a line (e.g., Page 302, TabbedPane 304, Pane1 306, TicketDetail 308, etc.), and instances of the class names are generally represented as the second word on a line (e.g., page 320, body, 322, pane1 324, ticketDetail 326, etc.)

Instances of the TabbedPane 304 and Form 312 classes (or components) are stateful, in that a user would expect his decision to "stick." At any given time, the TabbedPane 304 component shows only one of its child panes. That is, at any given time, TabbedPane 304 will show only one instance of the Pane1 306 or Pane2 310 components. Thus, once Pane1 306 is selected by the user, she expects it to remain selected in subsequent web requests. Similarly, if Pane2 310 (and thus instance pane2 328) is selected by a user, the user will expect Form 312 (and thus instance addTicket 330) to retains its values so that inputs provided by the user (using the respective subject 332, description 334, and discoveryDate 336 instances of the TextInput 314, TextArea 316, and DateInput 318 components) in one request may be processed in a subsequent request.

One known way of retaining state, as is shown in FIG. 2, is to define components such that they directly contain state parameters. Thus, with regard to FIG. 3, the body 322 instance of TabbedPane 304 class can contain state data indicating the currently selected pane (e.g., Pane1 306 or Pane2 310). Now, suppose Pane2 310 is selected. In this case, the addTicket 330 instance of Form 312 can include state information pertaining to data entered for the subject 332, description 334, and discoveryDate 336 instances.

FIG. 4, generally at 400, shows a form (or, grammar) of Pane2 310 that serves as a key to qualify, for example, a currently selected pane (e.g., pane2 308). A web application state is typically encoded into the "query string" portion of a URL. A web URL usually takes the form:

SCHEME+"://"+"HOST"+"/"+"APP"+"?"+QUERYSTRING

Examples utilizing the web URL form are as follows:
https://mit.edu/login?name=john
http://redhat.com/news?date=yesterday&numitems=12

The query string portion is made up of key-value pairs, or "query variables." A single key-value pair can be rendered as follows:

KEY+"="+VALUE

Examples of a key-value pair are as follows:
name=john
numItems=12

A query string can contain multiple query variables, joined using the ampersand (or, alternately, semicolon) character:

VAR1+"&"+VAR2+"&"+VAR3

Examples of a query string are as follows:
name=john&numItems=12
date=yesterday&id=23&enabled=true When a component hierarchy, such as shown in FIG. 3, is utilized to namespace component parameters to prevent collisions, a key to qualify the currently selected pane (e.g., pane2 310) can take the form as shown in FIG. 4. With regard to key 402, the instances of page 320, body 322, pane2 328 and addTicket 330, and the query string subject=Example+ticket 404, will appear in URLs, which can be bookmarked by a user. Thus, in existing UI frameworks, any changes to the component hierarchy 300 that impact the generation of keys, such as key 402, will break those URLs if one or more components are added to and/or deleted from the component hierarchy. That is, the URLs will no longer go to the place the user bookmarked. A good implementation that utilizes this pattern to generate URLs will endeavor to "fail gracefully," whereas a bad implementation may simply error out. In either case, URLs captured from such an application are not safe to use as are, for example, URLs that are persistent.

FIGS. 5 and 6, taken together, show how a bookmark can default to a home page after a change is made to a component hierarchy associated with a bookmark deep within a website. In particular, FIG. 5, generally at 500, is a screen display associated with a deep bookmark, and FIG. 6, generally at 600, is a screen display showing how the bookmark defaults to the home page of the website when the bookmark of FIG. 5 is accessed subsequent to a change in the component hierarchy of FIG. 5. As used herein, a deep bookmark is a bookmark associated with a domain name that refers to a page other than the home page.

Turning now to FIG. 5, suppose a person visits a web site, encounters a piece of content, and adds the content to her bookmarks folder. Thus, suppose a person bookmarks 502 the webpage shown in FIG. 5. Some time later, she clicks on the bookmark 502 to return to the content. If the structure of the webpage 500 shown in FIG. 5 has changed (e.g., one or more components have been added and/or one or more components have been deleted to the webpage shown in FIG. 5) subsequent to the bookmark, then, instead of having FIG. 5 displayed, the home page 600 may be displayed, as shown in FIG. 6. URL 602 shown in FIG. 6 is accordingly different than the bookmarked URL 502 that the user bookmarked in connection with FIG. 5. This scenario assumes that the components used for the web site generally have "default" failure mode states that they can use to render themselves, such that stateful components beneath the point of change in the component hierarchy can revert to their default states. A more severe case of failure would be that the user simply receives a File Not Found error, without being directed to the homepage.

FIG. 7, generally at 700, is an exemplary illustration of how an existing URL would be broken when a new component is added to a component hierarchy. Component hierarchy 710 is an existing hierarchy, and component hierarchy 720 is a hierarchy after a new browser 704 instance of a BrowserPane 702 class has been added to component hierarchy 710. A user's bookmark corresponding to component hierarchy 710 will contain the state parameter:

page.body.selectedPane=pane2

When a browser 704 instance of the BrowserPane 702 class is added to component hierarchy 710, thus resulting in component hierarchy 720, the page.body.selectedPane=pane2 state parameter no longer holds its meaning. Instead, the state parameter required is now:

page.browser.body.selectedPane=pane2

Thus, a component hierarchy can be utilized to avoid namespace collisions. However, the use of a component hierarchy to avoid namespace collisions can lead to another problem. Namely, as a result of adding one or more components to and/or deleting one or more components from the component hierarchy (e.g., adding a browser 704 instance to hierarchy 710, thus resulting in hierarchy 720), the user's bookmark associated with the state parameter associated with the initial component hierarchy no longer works (e.g., the user's bookmark associated with component hierarchy 710 no longer works after browser 704 is added).

At least one embodiment of the present invention is directed to preserving state when one or more components are added to and/or one or more components are deleted from a component hierarchy, and making web UI code easier to reuse by, for example, modeling state data associated with components in a hierarchy that is separate and distinct from the component hierarchy.

SUMMARY OF THE INVENTION

In at least one embodiment of the present invention, a system, method and medium is provided for defining and using non-isomorphic mappings from user-interface (UI) components to components that contain, for example, HTTP state information for respective UI components. One or more embodiments of the present invention separate the visual nesting of components (the component hierarchy) from the organization of state parameters (the parameter hierarchy). Since URLs (bookmarks) are generated from the parameter hierarchy, URLs that predate the change to the page's appearance will continue to work correctly.

One or more embodiments of the present invention thus provide a system, method and medium for rendering stable URLs that are safe from changes to the details of a UI's implementation, while preserving component state management.

Used in a web UI framework, one or more embodiments of the present invention thus makes possible reusable, state-managed software components, while preserving the version-to-version addressability of web interface URLs. The present invention can advantageously be utilized in conjunction with systems that support Graphical User Interface-style (GUI-style) programming of user interface (UI) components in the context of web protocols such as HTTP and HTML.

In one embodiment of the present invention, a method for utilizing a parameter hierarchy having state information to generate a uniform resource locator (URL) includes the steps of creating a component hierarchy that includes at least one component object associated with a web page, and creating a parameter hierarchy that includes at least one parameter object including state information respectively associated with at least one of the component objects. The parameter hierarchy is utilized to generate a URL that can be utilized to render the component hierarchy. At least one of the component objects can point to at least one of the respective parameter objects that contains state information associated with the respective component object(s).

In addition, at least one component object can be added to the component hierarchy, and at least one parameter object can be added to the parameter hierarchy. The at least one parameter object is respectively associated with and includes state information associated with the at least one component object that has been added. The URL that was previously generated can be utilized to render the component hierarchy that existed before a new component object was added. A pointer can be used such that the component objects point to a respective parameter object that contains its state information. Any of the original or new component objects can contain content, such as text, graphics, tables, frames, and the like.

In addition to and/or in lieu of adding a new component to an existing component hierarchy, one or more components can also be deleted from the existing component hierarchy. In this case, the previously generated URL can also be used to render the component hierarchy that had one or more of its components deleted.

In another embodiment of the present invention, a system is provided that generates a URL for a component-based user interface. The system includes an operating system, and at least one processor that uses at least one software module to create a component hierarchy that includes at least one component object associated with a web page, and create a parameter hierarchy that includes at least one parameter object that includes state information respectively associated with at least one of the component objects. The at least one processor and at least one software module also utilize the state information to generate a URL that can be utilized to render the component hierarchy.

The system can also utilize the at least one processor and the at least one software module to add at least one component object to the component hierarchy, and add at least one parameter object to the parameter hierarchy that is respectively associated with and includes state information associated with the at least one added component object. The URL that was previously generated can also be used to render the component hierarchy that has the at least one new component.

In addition, the system can also utilize a pointer that enables the component objects to point to a parameter object that contains the state information for the component object.

Any of the original or new component objects can contain content, such as text, graphics, tables, frames, and the like.

The at least one processor may further use the at least one software module to delete at least one component object from the component hierarchy, and utilize at least the originally generated URL to render the component hierarchy that had one or more components deleted therefrom.

In another embodiment of the present invention, a computer program product resides on a computer readable medium that can be used to generate a URL for a component-based user interface. The computer program product includes instructions for causing a computer to create a component hierarchy that includes at least one component object associated with a web page, and create a parameter hierarchy that includes at least one parameter object that contains state information respectively associated with at least one of the component objects. The computer program product utilizes the state information to generate a URL that can be utilized to render the component hierarchy.

In addition, the computer program product can include instructions that cause a computer to add at least one component object to the component hierarchy, and add at least one parameter object to the parameter hierarchy that is respectively associated with and includes state information associated with the at least one newly added component object. The computer program product also includes instructions such that the originally generated URL can be used to render the new component hierarchy that has at least one new component added thereto.

In addition, the computer program product can include instructions for causing a computer to delete at least one component object from the component hierarchy, and utilize at least the originally generated URL to render the component hierarchy that had one or more components deleted therefrom.

In another embodiment of the present invention, a method for utilizing a parameter hierarchy having state information to generate a uniform resource locator (URL) includes the steps of utilizing a component hierarchy that includes at least one component object associated with a web page, and utilizing a parameter hierarchy that includes at least one parameter object that contains state information respectively associated with at least one of the component objects. The parameter hierarchy can be utilized to generate a URL that can be utilized to render the component hierarchy. In addition to utilizing the component hierarchy and the parameter hierarchy, the method may also create the component hierarchy and/or the parameter hierarchy.

In another embodiment of the present invention, a system for generating a URL for a component-based user interface includes an operating system, and at least one processor that uses at least one software module to utilize a component hierarchy that includes at least one component object associated with a web page, and utilize a parameter hierarchy that includes at least one parameter object that contains state information respectively associated with at least one of the component objects. The processor can utilize the at least one software module to utilize the state information to generate a URL that can be utilized to render the component hierarchy. In addition, the processor can also utilize the at least one software module to create the component hierarchy and/or create the parameter hierarchy.

In yet another embodiment of the present invention, a computer program product residing on a computer readable medium, for generating a URL for a component-based user interface, includes instructions for causing a computer to utilize a component hierarchy that includes at least one component object associated with a web page, and utilize a parameter hierarchy that includes at least one parameter object that contains state information respectively associated with at least one of the component objects. The computer readable medium includes instructions that cause the computer to utilize the state information to generate a URL that can be utilized to render the component hierarchy. In addition, the computer program product can also include instructions for causing a computer to create the component hierarchy and/or create the parameter hierarchy.

There has thus been outlined, rather broadly, the features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Other features of the present invention will be evident to those of ordinary skill, particularly upon consideration of the following detailed description of the preferred embodiments.

BRIEF DESCRIPTION OF THE DRAWINGS

The detailed description of the present application showing various distinctive features may be best understood when the detailed description is read in reference to the appended drawing in which:

FIG. 3 is a diagram of an exemplary tree of components.

FIG. 5 is a screen display associated with a deep bookmark.

DETAILED DESCRIPTION OF PREFERRED EMBODIMENTS

Figure 1:
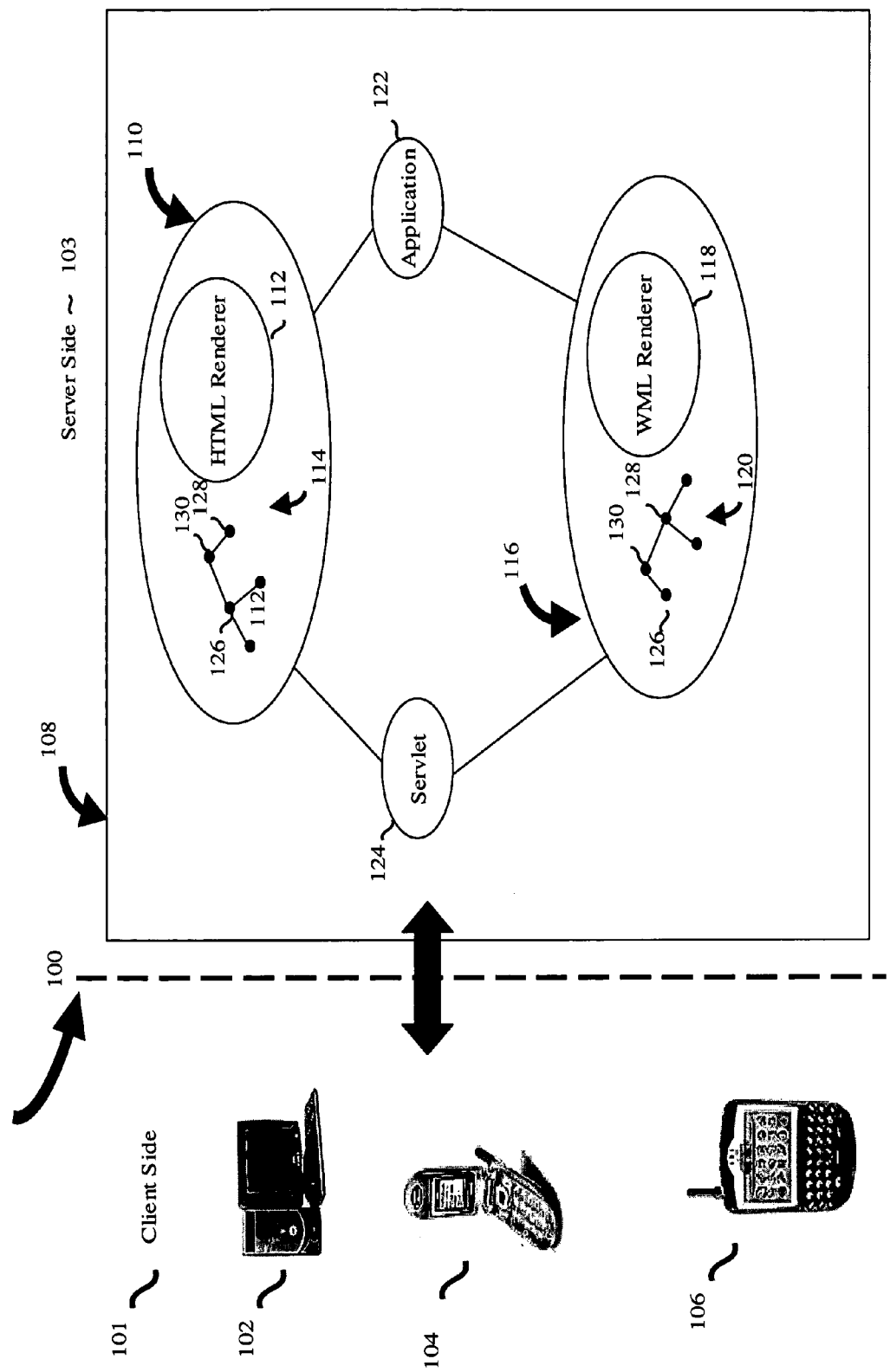
FIG. 1 is a diagram of an exemplary simplified architecture of JavaServer™ Faces (JSF).
Figure 2:
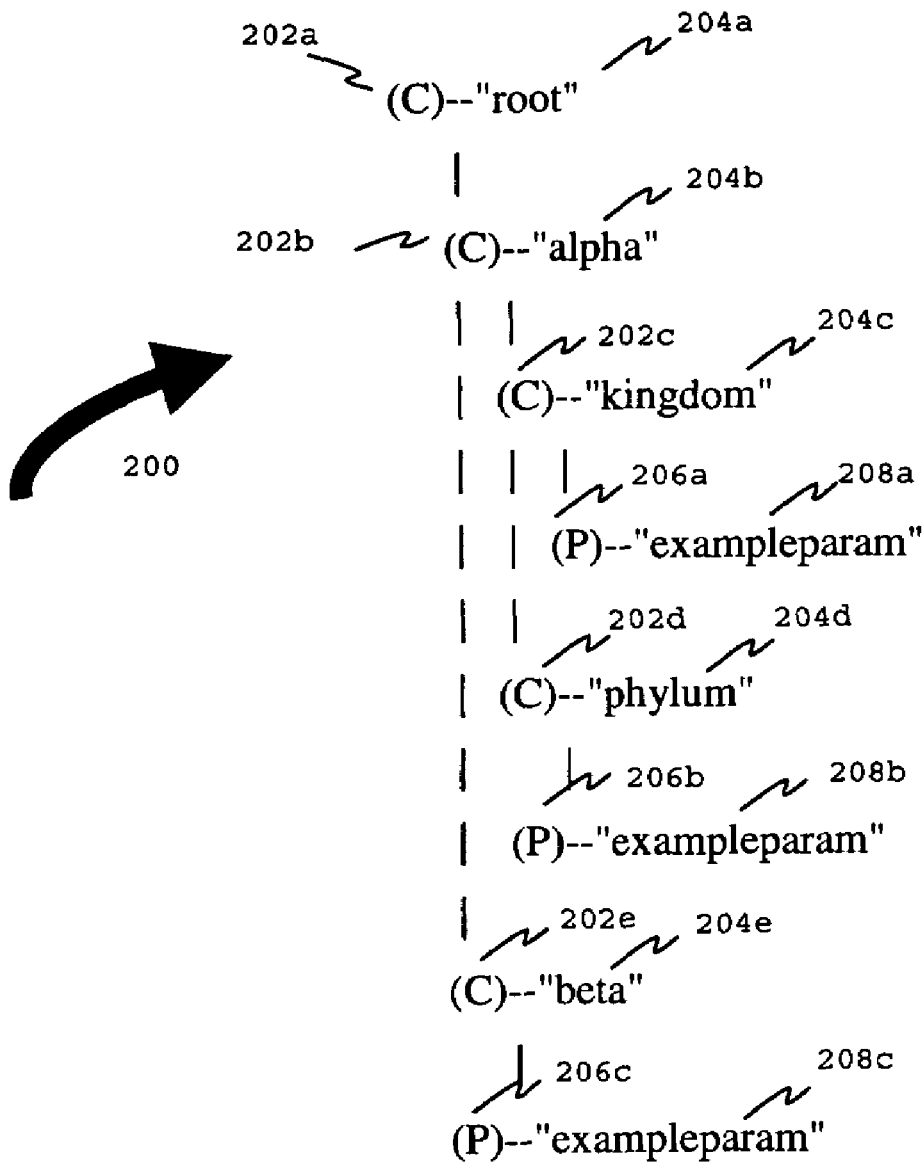
FIG. 2 is a diagram of an exemplary component hierarchy.
Figure 4:
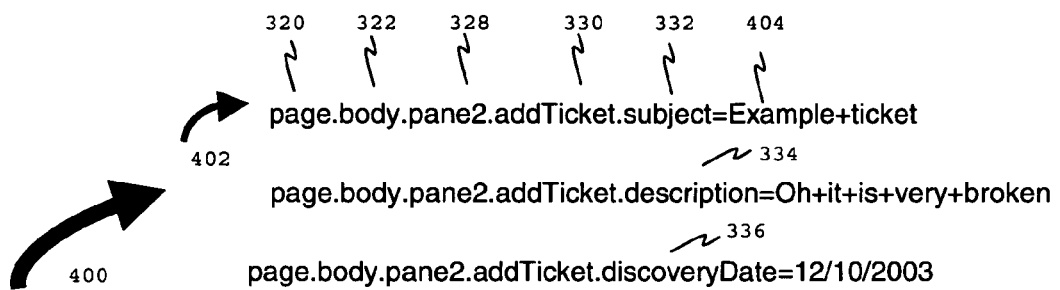
FIG. 4 is a diagram illustrating an exemplary form of a component selected in FIG. 3.
Figure 6:
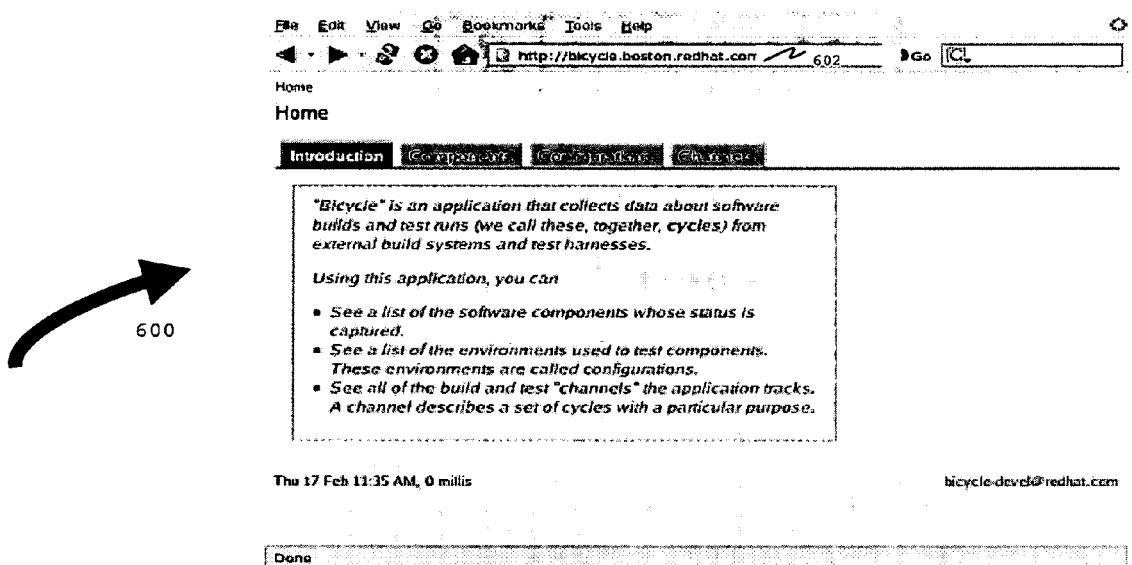
FIG. 6 is a screen display showing a web site home page that can be displayed after the component hierarchy associated with the webpage changes.
Figure 7:
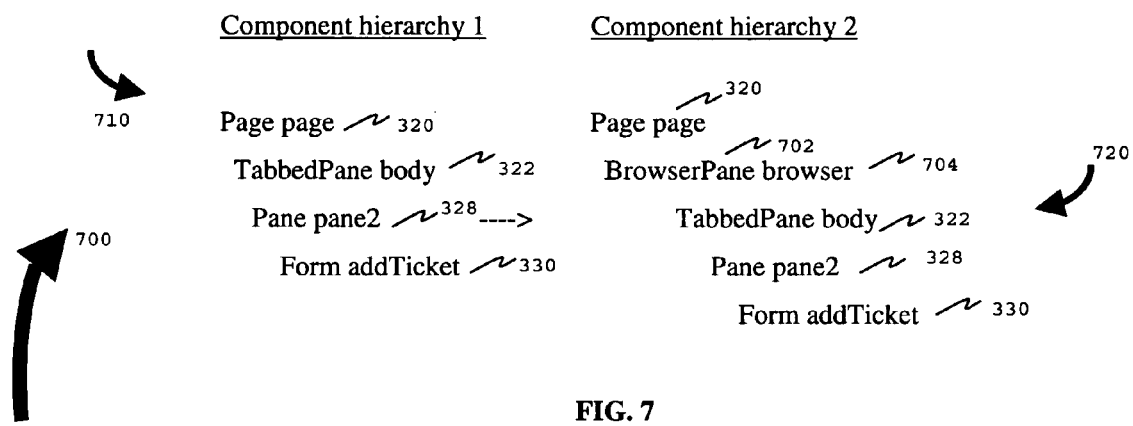
FIG. 7 is a diagram of an exemplary illustration indicating how an existing bookmark would be broken when a new component is added to a component hierarchy.

At least one embodiment of the present invention provides a system, method and medium for introducing an indirection between components 126, 128, 130 (see FIG. 1) and HTTP state parameters associated with respective components that enables both component reusability and URL stability. As used herein, a component 126, 128, 130 is a stateful user interface (UI) object that can reside in a tree of components 114, 120. In accordance with one or more embodiments of the present invention, a component (e.g., components 126, 128, 130) can contain a reference to an object, which serves as a state container for the component. A component 126, 128, 130 uses its state and its configuration to render part of a web UI. Embodiments of the present invention can advantageously serve to at least partially bridge the gap between URIs and Uniform Resource Names (URNs) by making URIs that contain parameter state more persistent. Embodiments of the present invention are thus applicable to URIs and URNs, as well as, for example, to URLs. As used herein, a URN refers to the subset of URIs that are required to remain globally unique and persistent even when the resource ceases to exist or becomes unavailable. Further information pertaining to URIs, URLs, and URNs is contained in the Internet Engineering Task Force document Request for Comments: 2396, Updates: 1808, 1738, dated August 1998, by T. Berners-Lee et al., entitled Uniform Resource Identifiers (URI): Generic Syntax, which is incorporated herein by reference.

Figure 8:
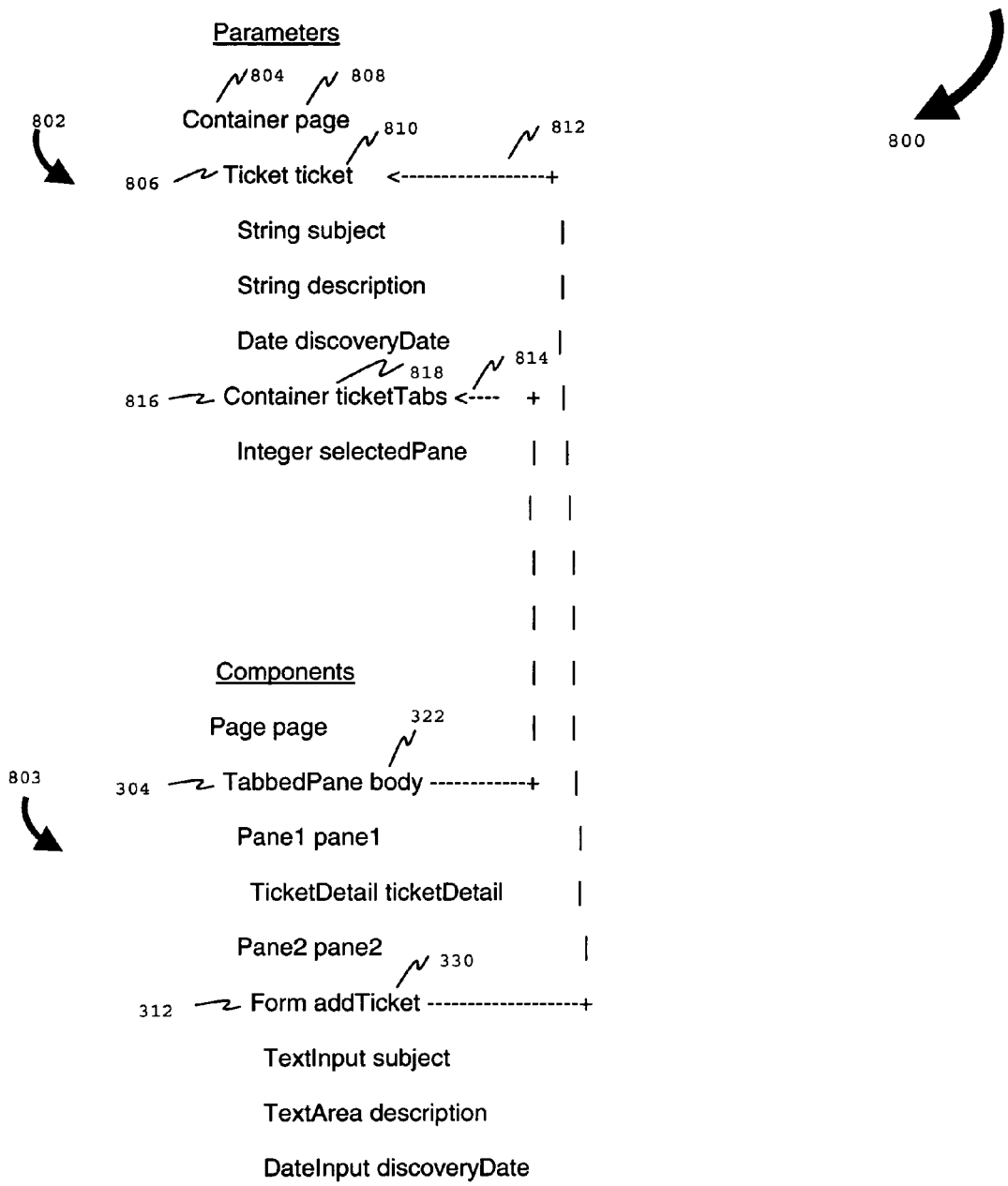
FIG. 8 is an illustration of an exemplary embodiment of the invention in which a parameter hierarchy is modeled distinct from a component hierarchy.

FIG. 8, generally at 800, is an exemplary illustration of an embodiment of the invention in which a parameter hierarchy 802 is modeled distinct from a component hierarchy 803. Objects within parameter hierarchy 802 contain state information for objects within component hierarchy 803. Thus, ticket 810 contains state information for addTicket 330, and ticketTabs 818 contains state information for body 322. The nomenclature utilized in FIG. 8 is the same as that utilized in FIG. 3. Namely, class names are generally represented as the first word on a line (e.g., Container 804, Ticket 806, etc.), and instances of the class names are generally represented as the second word on a line (e.g., page 808, ticket 810, etc.).

In accordance with one or more embodiments of the invention, component hierarchy 803 can point to objects within parameter hierarchy 802, as shown, for example, at 812, 814. Thus, for example, an instance of a TabbedPane 304 class named body 322 can point 814 to (or otherwise reference) an instance of a Container 816 class named ticketTabs 818 of parameter hierarchy 802. Similarly, an instance of a Form 312 class named addTicket 330 can point 812 to an instance of a Ticket 806 class named ticket 810 of parameter hierarchy 802. With regard to a component pointing to or otherwise referencing a parameter, the component may directly point to or reference the parameter, or indirectly point to or reference the parameter.

Figure 9:
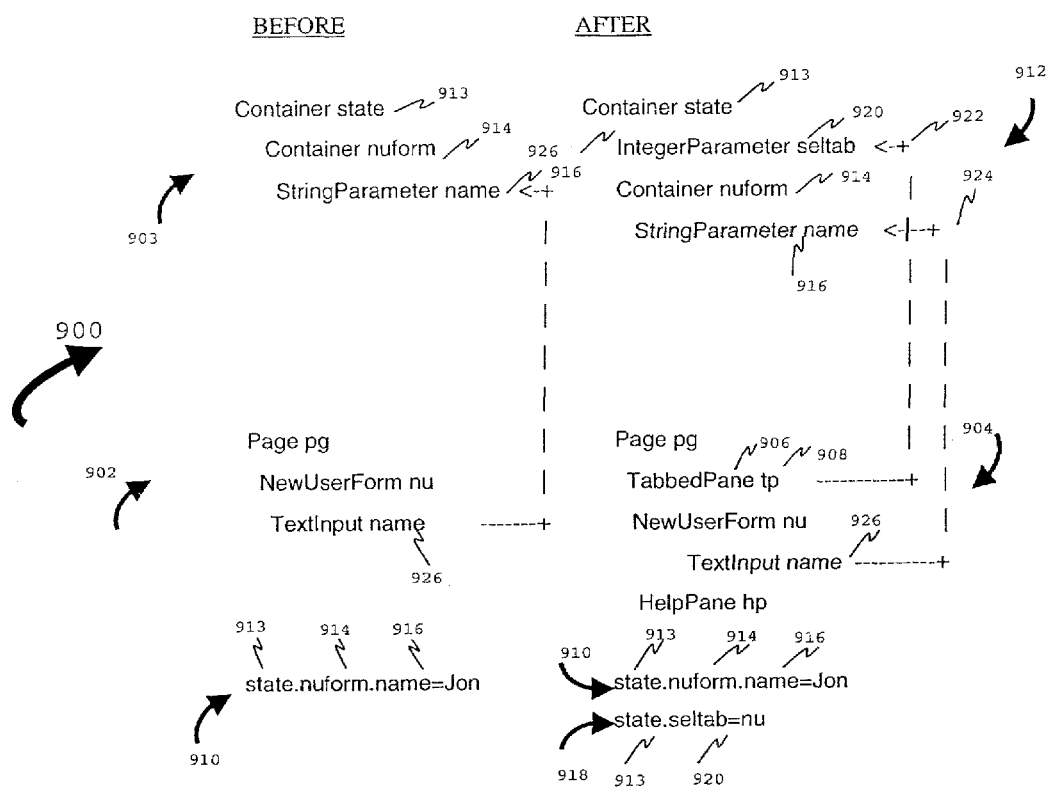
FIG. 9 illustrates a scenario in which a new stateful component is introduced into a component hierarchy.

FIG. 9, generally at 900, is an exemplary embodiment of the present invention illustrating of how an existing URL would be not broken when a new component is added to an existing component hierarchy. Component hierarchy 902 is an existing hierarchy, and component hierarchy 904 is a hierarchy after an instance of a TabbedPane 906 class named tp 908 has been added to component hierarchy 902. A user's bookmark corresponding to component hierarchy 902 can contain the state parameter state.nuform.name=Jon 910.

When tp 908 is added to component hierarchy 902, thus resulting in component hierarchy 904, state parameter state.nuform.name=Jon 910 continues to hold its meaning. Note that state parameter state.nuform.name=Jon 910 includes state 913, nuform 914 and name 916. In addition, a new state parameter state.seltab=nu 918 is added, which accounts for the addition of tp 908. As a result, the user's bookmark associated with the state parameter state.nuform.name=Jon 910 continues to work for component hierarchy 904 as it did for component hierarchy 902. In accordance with one or more embodiments of the present invention, a programmer can thus advantageously program reference 924 (e.g., a pointer) such that it maintains its association in parameter hierarchy 912 with name 926. Reference 922 can also be added to point from tp 908 to seltab 920.

Figure 10:
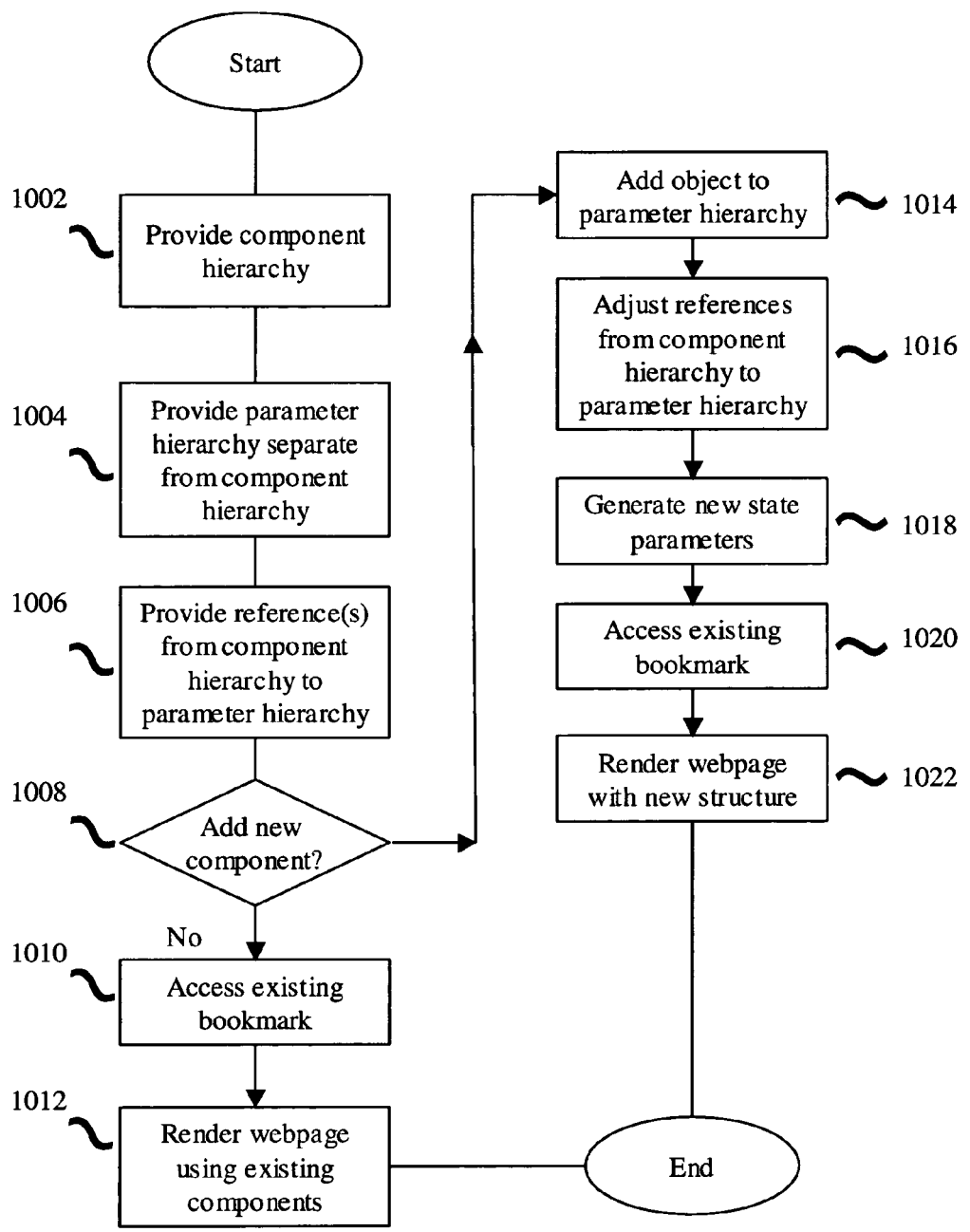
FIG. 10 is an exemplary method in accordance with the present invention.

FIG. 10 is an exemplary method in accordance with one or more embodiments of the present invention. At step 1002, a component hierarchy 902 is provided, and at step 1004 a parameter hierarchy 903 containing instantiated objects that contain state information for component hierarchy 902 objects is provided. At step 1006, one or more references (e.g., pointers 924) is respectively provided from one or more objects in component hierarchy 902 (e.g., name 926) to a respective object (e.g., name 916) within parameter hierarchy 903.

At decision step 1008, a determination is made as to whether one or more new components have been added to component hierarchy 902. If no new components have been added, an existing bookmark can be accessed at step 1010, and the web page can be rendered at step 1012.

If, at decision step 1008, it is determined that one or more new components have been added to component hierarchy 902, then, at step 1014, an object corresponding to the newly added component is added to parameter hierarchy 912. For example, an instance of an IntegerParameter 926 class named seltab 920 can be added to parameter hierarchy 903, thus resulting in parameter hierarchy 912.

At step 1016, a programmer can adjust any references (e.g., a pointer) from an object (e.g., name 926) within component hierarchy 904 to the object (e.g., name 916) within parameter hierarchy 912 that contains the state information for the object within the parameter hierarchy 904. Adjustments can me made to accommodate the addition of one or more components to a component hierarchy and/or the deletion of one or more components from a component hierarchy. At step 1018, a new state parameter (e.g., state.seltab=nu 918) can be generated, which will contain the state information for the newly added component.

At step 1020, a user can access a URL that was bookmarked before the addition of one or more components to a component hierarchy and/or the deletion of one or more components from a component hierarchy. At step 1022, a web page that may include, for example, a newly added component (e.g., TabbedPane 906) can be rendered using a URL that was bookmarked marked before the addition of the new component. More particularly, the new state parameter generated in step 1018 (e.g., state.seltab=nu 918) can be utilized in conjunction with an existing state parameter (e.g., state.nuform.name=Jon 910), so that an existing bookmark can be utilized to render the website containing a one or more newly added components. Similarly, a web page that may have, for example, a (previously existing) component deleted therefrom can be rendered using a URL that was bookmarked marked before the component was deleted.

In accordance with one or more embodiments of the invention, therefore, introducing a stateful component to a component hierarchy will mean only an additive (non-destructive) change to a URL. Pre-existing URLs will work correctly, as only the state of the newly added component will revert to its default. Embodiments of the present invention, therefore, can be utilized to minimize potential disruption of bookmarks when one or more components are added to a component hierarchy and/or one or more components are deleted from a component hierarchy.

The many features and advantages of embodiments of the present invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for utilizing a parameter hierarchy having state information to generate a uniform resource locator (URL), comprising the steps of:
    a) creating, based on a web page, a component hierarchy comprising at least one component object associated with the web page;
    b) creating a parameter hierarchy comprising at least one parameter object comprising state information respectively associated with the at least one component object, the parameter hierarchy being modeled distinct from the component hierarchy; and
    c) utilizing the parameter hierarchy to generate a URL that can be utilized to render the component hierarchy.

2. The method of claim 1, wherein the at least one component object points to at least one respective parameter object that contains state information associated with the at least one component object.

3. The method of claim 1, further comprising the steps of:
    d) adding at least one component object to the component hierarchy;
    e) adding at least one parameter object to the parameter hierarchy respectively associated with and comprising state information associated with the at least one component object added in step d); and
    f) utilizing at least the URL generated in step c) to render the component hierarchy of said step d).

4. The method of claim 3, wherein the at least one component object of step d) points to at least one respective parameter object of step e).

5. The method of claim 3, wherein the at least one component object of step d) contains new content.

6. The method of claim 5, wherein the at least one component object of step d) comprises a frame.

7. The method of claim 1, further comprising the steps of:
    d) deleting at least one component object from the component hierarchy; and
    e) utilizing at least the URL generated in step c) to render the component hierarchy of step d).

8. A system for generating a uniform resource locator (URL) for a component-based user interface, comprising:
    an operating system; and
    at least one processor that uses at least one software module to: (a) create, based on a web page, a component hierarchy comprising at least one component object associated with the web page; b) create a parameter hierarchy comprising at least one parameter object comprising state information respectively associated with the at least one component object, the parameter hierarchy being modeled distinct from the component hierarchy; and c) utilize the state information to generate a URL that can be utilized to render the component hierarchy.

9. The system of claim 8, wherein the at least one processor further uses the at least one software module to:
    d) add at least one component object to the component hierarchy;
    e) add at least one parameter object to the parameter hierarchy respectively associated with and comprising state information associated with the at least one component object added in part d); and
    f) utilize at least the URL generated in part c) to render the component hierarchy of said part d).

10. The system of claim 9, wherein the at least one processor further uses the at least one software module to utilize a pointer that enables the at least one component object of part d) to point to at least one respective parameter object of part e).

11. The system of claim 10, wherein the at least one component object of part d) contains new content.

12. The system of claim 8, wherein the at least one processor further uses the at least one software module to:
    d) delete at least one component object from the component hierarchy; and
    e) utilize at least the URL generated in part c) to render the component hierarchy of said part d).

13. A computer program product residing on a computer readable medium, for generating a uniform resource locator (URL) for a component-based user interface, the computer program product comprising instructions for causing a computer to:
    a) create, based on a web page, a component hierarchy comprising at least one component object associated with the web page;
    b) create a parameter hierarchy comprising at least one parameter object comprising state information respectively associated with the at least one component object, the parameter hierarchy being modeled distinct from the component hierarchy; and
    c) utilize the state information to generate a URL that can be utilized to render the component hierarchy.

14. The computer program product according to claim 13, further comprising instructions for causing a computer to:
    d) add at least one component object to the component hierarchy;
    e) add at least one parameter object to the parameter hierarchy respectively associated with and comprising state information associated with the at least one component object added in part d); and
    f) utilize at least the URL generated in part c) to render the component hierarchy of said part d).

15. The computer program product according to claim 13, further comprising instructions for causing a computer to:
    d) delete at least one component object from the component hierarchy; and
    e) utilize at least the URL generated in part c) to render the component hierarchy of said part d).

* * * * *